(12) United States Patent
Seo et al.

(10) Patent No.: US 11,347,094 B2
(45) Date of Patent: May 31, 2022

(54) DISPLAY DEVICE AND MANUFACTURING METHOD THEREOF

(71) Applicant: Samsung Display Co., Ltd., Yongin-Si (KR)

(72) Inventors: Yun Min Seo, Hwaseong-si (KR); Tae Gyun Kim, Seoul (KR); Yong Doo Park, Cheonan-si (KR); Bum Lee, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/000,171

(22) Filed: Aug. 21, 2020

(65) Prior Publication Data

US 2021/0191177 A1    Jun. 24, 2021

(30) Foreign Application Priority Data

Dec. 20, 2019   (KR) .......................... 10-2019-0171714

(51) Int. Cl.
  *G02F 1/1333*   (2006.01)
  *G02F 1/1335*   (2006.01)
  *G06F 3/041*    (2006.01)
  *G06F 3/044*    (2006.01)

(52) U.S. Cl.
  CPC .... *G02F 1/13338* (2013.01); *G02F 1/133512* (2013.01); *G06F 3/0412* (2013.01); *G06F 3/0445* (2019.05); *G06F 3/0446* (2019.05); *G06F 2203/04103* (2013.01)

(58) Field of Classification Search
  CPC combination set(s) only.
  See application file for complete search history.

(56) References Cited

U.S. PATENT DOCUMENTS

| 10,042,490 | B2 | 8/2018 | Li et al. |
| 2018/0136773 | A1* | 5/2018 | Chen .................... G06F 3/04164 |
| 2018/0150180 | A1 | 5/2018 | Aoyama et al. |

FOREIGN PATENT DOCUMENTS

| KR | 2017-0054844 A | 5/2017 |
| KR | 10-1770319 B1 | 8/2017 |
| KR | 2018-0036367 A | 4/2018 |

* cited by examiner

*Primary Examiner* — Deeprose Subedi
(74) *Attorney, Agent, or Firm* — Innovation Counsel LLP

(57) ABSTRACT

A display device includes a lower panel including a first substrate and at least one transistor disposed on the first substrate; and an upper panel facing the lower panel and including a first touch conductive layer including a second substrate, sensing electrodes disposed on the second substrate and including a first sensing electrode, and sensing lines including a second sensing line, a first insulating layer disposed on the first touch conductive layer, and a second touch conductive layer disposed on the first insulating layer including a blocking layer overlapping the sensing electrodes and the sensing lines and a connection electrode overlapping the first sensing electrode, the first sensing line, and the second sensing line.

15 Claims, 14 Drawing Sheets

DISPLAY DEVICE AND MANUFACTURING METHOD THEREOF

This application claims priority under 35 U.S.C. § 119 to Korean Patent Application No. 10-2019-0171714 filed on Dec. 20, 2019 in the Korean Intellectual Property Office, the disclosure of which is incorporated by reference herein in its entirety.

BACKGROUND

1. Field

The present disclosure relates to a display device and a manufacturing method of the display device.

2. Description of the Related Art

The importance of a display device has increased with the development of multimedia. Accordingly, various types of display devices such as a liquid crystal display (LCD) and an organic light emitting display (OLED) have been used.

Among display devices, a liquid crystal display device, which is one of the most widely used flat panel display devices, includes two substrates including electric field generating electrodes such as a pixel electrode and a common electrode and a liquid crystal layer disposed in between the pixel electrode and the common electrode. In the liquid crystal display device, a voltage is applied to the electric field generating electrodes to form an electric field in the liquid crystal layer, so that the alignment of liquid crystal molecules in the liquid crystal layer is determined, and the polarization of incident light is controlled, to display an image.

Meanwhile, the liquid crystal display device may further include a touch member that recognizes a user's touch and calculates coordinates of the corresponding area. The touch member may be attached onto the display panel as a film or a panel, but may be provided in a display panel.

In this case, there is a feature that the overall thickness of the liquid crystal display device is reduced.

However, sensing electrodes and sensing lines may form conductive layers and parasitic capacitances in the display panel, thereby causing a deviation in touch sensitivity of the display device.

SUMMARY

An embodiment provides a display device capable of reducing an influence of an electric field between a sensing electrode and a lower panel.

An embodiment provides a method of manufacturing a display device capable of reducing an influence of an electric field between a sensing electrode and a lower panel.

According to an embodiment, a display device include a lower panel including a first substrate and at least one transistor disposed on the first substrate; and an upper panel facing the lower panel and including a first touch conductive layer including a second substrate, sensing electrodes disposed on the second substrate and including a first sensing electrode, and sensing lines including a second sensing line, a first insulating layer disposed on the first touch conductive layer, and a second touch conductive layer disposed on the first insulating layer including a blocking layer overlapping the sensing electrodes and the sensing lines and a connection electrode overlapping the first sensing electrode, the first sensing line, and the second sensing line.

The display device may further include a liquid crystal layer disposed between the lower panel and the upper panel.

The connection electrode may be electrically connected to the first sensing line and the second sensing line through a line connection contact hole penetrating the first insulating layer.

The sensing electrodes may be arranged along a first direction and a second direction crossing the first direction.

The first sensing line may extend to one side of the first direction, the second sensing line may extend to an other side of the first direction. The line connection contact hole may include a first line connection contact hole connecting the connection electrode and the first sensing line and a second line connection contact hole connecting the connection electrode and the second sensing line.

The sensing electrodes may include a second sensing electrode disposed at one side of the first sensing electrode in the first direction and a third sensing electrode disposed at the other side of the first sensing electrode in the first direction. The first sensing electrode may be electrically connected to the second sensing electrode through the first sensing line, and the first sensing electrode may be electrically connected to the second sensing electrode through the second sensing line.

The connection electrode may be electrically connected to the first sensing electrode through an electrode connection contact hole extending through the first insulating layer.

The first sensing electrode may further include a sensing protrusion electrode protruding between the first sensing line and the second sensing line in a plan view. The connection electrode may be electrically connected to the sensing protrusion electrode through the electrode connection contact hole.

The sensing electrodes may further include a fourth sensing electrode disposed at one side of the first sensing electrode in the second direction. The first sensing electrode may further include a sensing connection electrode extending from the sensing protrusion along the second direction. The sensing connection electrode of the first sensing electrode may be connected to the fourth sensing electrode.

Each of the first sensing line and the second sensing line may include an expansion sensing portion overlapping the connection electrode and an extension sensing portion not overlapping the connection electrode. A width of the expansion sensing portion may be greater than a width of the extension sensing portion.

The blocking layer may be disposed to overlap sensing electrode rows arranged in the first direction, and may be disposed not to overlap a space between the sensing electrode rows spaced apart from each other along the second direction.

The blocking layer may be disposed to overlap the extension sensing portion, and may be disposed not to overlap the expansion sensing portion.

The upper panel may further include a second insulating layer disposed on the second touch conductive layer and a black matrix disposed on the second insulating layer. The black matrix may be disposed to overlap sensing electrode rows arranged in the first direction and may be disposed not to overlap a space between the sensing electrode rows spaced apart from each other.

The upper panel may further include a common electrode disposed on the black matrix, and the common electrode has a planar shape.

The lower panel may further include a pixel electrode disposed in a space between the sensing electrode rows in a plan view and connected to a first transistor of the at least one transistor.

Each of the first touch conductive layer and the second touch conductive layer may include an opaque conductive material.

A synchronous signal may be applied to the sensing electrode and the blocking layer.

According to an embodiment, a method of manufacturing a display device includes: forming a first touch conductive layer on a substrate, the first touch conductive layer including a sensing electrode and a sensing line connected to the sensing electrode; forming a first insulating layer on the first touch conductive layer; and forming a second touch conductive layer on the first insulating layer. The second touch conductive layer includes a blocking layer overlapping the sensing electrode and the sensing line and a connection electrode overlapping the sensing electrode and the sensing line.

Each of the first touch conductive layer and the second touch conductive layer may include an opaque conductive material.

A synchronous signal may be applied to the sensing electrode and the blocking layer.

However, aspects of the inventive concept are not restricted to the one set forth herein. The above and other aspects of the inventive concept will become more apparent to one of ordinary skill in the art to which the present disclosure pertains by referencing the detailed description given below.

BRIEF DESCRIPTION OF THE DRAWINGS

The above and other aspects and features of the inventive concept will become more apparent by describing in detail embodiments with reference to the attached drawings.

DETAILED DESCRIPTION OF THE EMBODIMENTS

Figure 1:
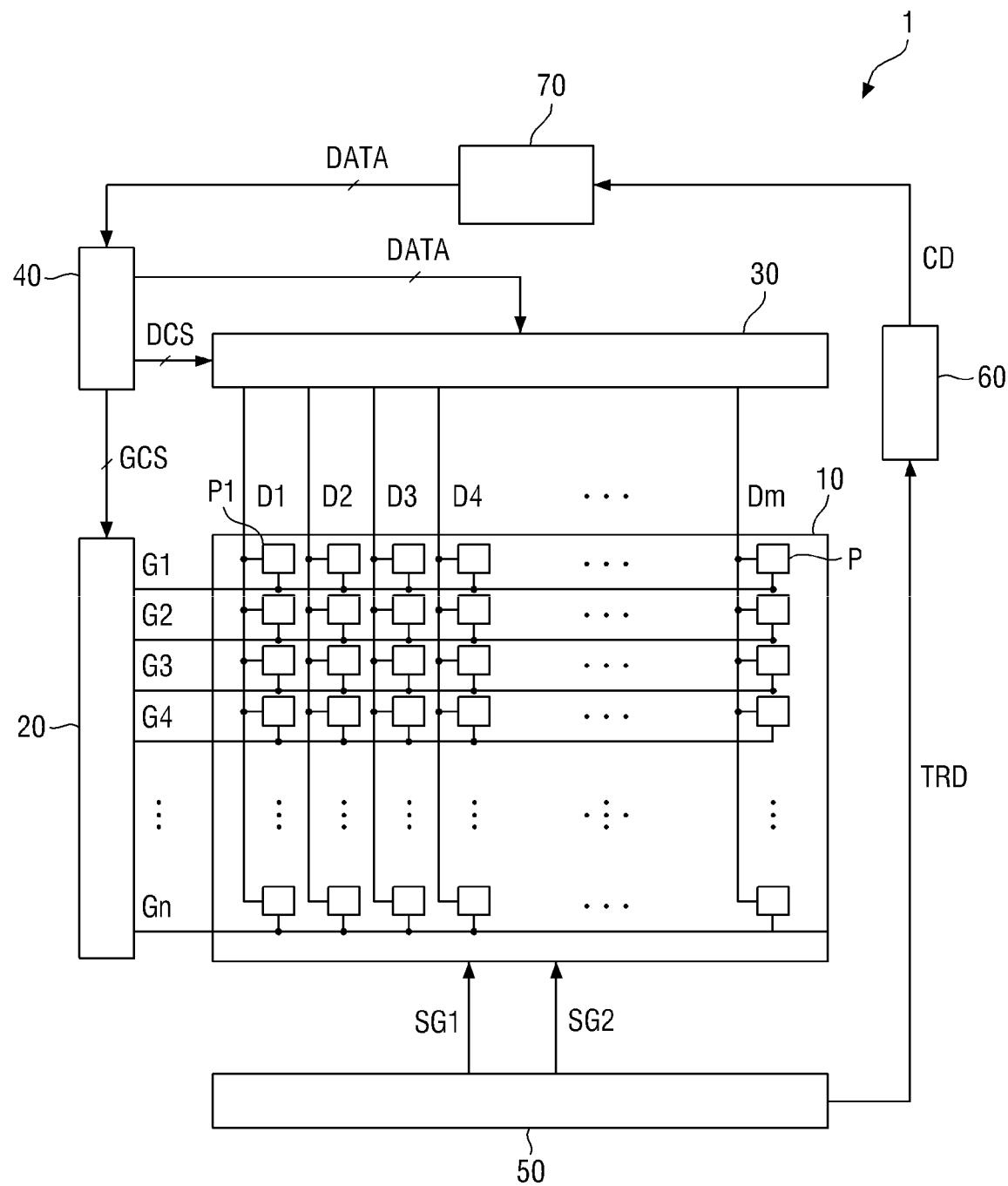
FIG. 1 is a block diagram schematically illustrating a display device according to an embodiment.

Specific structural and functional descriptions of embodiments disclosed herein are only for illustrative purposes of the embodiments of the invention. The embodiments may be embodied in many different forms without departing from the spirit and significant characteristics of the inventive concept. Therefore, the embodiments are disclosed only for illustrative purposes and should not be construed as limiting the inventive concept. That is, the inventive concept is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity, e.g., the limitations of the measurement system. For example, "about" can mean within one or more standard deviations, or within ±30%, 20%, 10% or 5% of the stated value.

Unless otherwise defined, all terms, including technical and scientific terms, used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described with reference to the attached drawings.

FIG. 1 is a block diagram schematically illustrating a display device 1 according to an embodiment.

Referring to FIG. 1, a display device 1 may refer to any electronic device that provides a display screen. Examples of the display device 1 may include televisions, notebooks, monitors, billboards, internet of things (IOTs) as well as portable electronic appliances such as mobile phones, smart phones, tablet personal computers (tablet PCs), smart watches, watch phones, mobile communication terminals, electronic notebooks, electronic books, portable multimedia players (PMPs), navigators, game machines, and digital cameras.

The display device 1 according to an embodiment includes a display panel 10, a gate driver 20, a data driver 30, a timing controller 40, a touch driver 50, a touch coordinate calculator 60, and a main processor 70.

The display panel 10 provides a display screen. In an embodiment, the display panel 10 may be a liquid crystal display panel.

The display panel 10 includes a lower panel, an upper panel, and a liquid crystal layer interposed between the lower panel and the upper panel. Data lines D1 to Dm, where m is a positive integer of 2 or more, gate lines G1 to Gn, where n is a positive integer of 2 or more, and touch driving lines are formed on the lower panel of the display panel 10. The data lines D1 to Dm and the touch driving lines may intersect the gate lines G1 to Gn.

Figure 4:
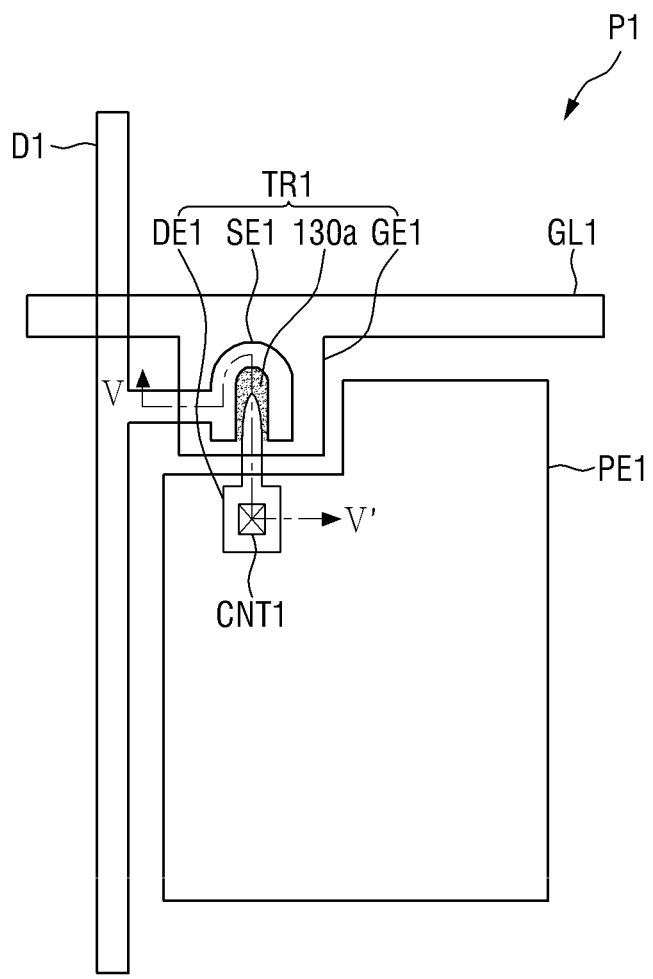
FIG. 4 is a layout view specifically illustrating a first pixel.

Pixels P may be formed at intersections of the data lines D1 to Dm and the gate lines G1 to Gn as shown in FIG. 1. Each of the pixels P may be connected to a data line and a gate line. Each of the pixels P may include at least one thin film transistor. The thin film transistor may include a gate electrode, a channel region of a semiconductor layer, a source electrode, and a drain electrode. FIG. 4 illustrates a first transistor TR1 as an example of the thin film transistor, and the first transistor TR1 may include a channel region 130a, a first gate electrode GE1, a first source electrode SE1, and a first drain electrode DEl.

A black matrix, a color filter, and the like may be formed on the upper panel of the display panel 10. A polarizing plate is attached to each of the upper and lower panels of the display panel 10, and an alignment film for setting a pre-tilt angle of liquid crystals is formed. A column spacer is formed between the upper panel and lower panel of the display panel 10 to maintain a cell gap of a liquid crystal cell.

A backlight unit may be disposed under the rear surface of the lower panel of the display panel 10. The backlight unit is implemented as an edge type or direct type backlight unit to irradiate the display panel 10 with light.

The gate driver 20 generates gate signals according to a gate control signal GCS input from the timing controller 40. The gate driver 20 supplies gate signals to the gate lines G1 to Gn in a predetermined order. The predetermined order may be a sequential order.

The data driver 30 receives digital video data DATA and a data control signal DCS from the timing controller 40. The data driver 30 converts the digital video data DATA into analog data voltages according to the data control signal DCS. The data driver 30 supplies data voltages to the data lines D1 to Dm.

The timing controller 40 receives digital video data DATA and timing signals from the main processor 70.

The timing controller 40 generates the gate control signal GCS for controlling the operation timing of the gate driver 20 and the data control signal DCS for controlling the operation timing of the data driver 30 based on the timing signals. The timing controller 40 outputs the gate control signal GCS to the gate driver 20, and outputs the digital video data DATA and the data control signal DCS to the data driver 30.

The touch coordinate calculator 60 receives a touch row data TRD from the touch driver 50. The touch coordinate calculator 60 determines that a user's touch has occurred when the touch row data TRD of a first reference value or more is input, and calculates coordinates of the touch electrode of the touch row data TRD of the first reference value or more as touch coordinates. The touch coordinate calculator 60 outputs touch coordinate data CD including information about the touch coordinates to the main processor 70.

The main processor 70 may be implemented as a central processing unit (CPU) of any one of a navigation system, a set-top box, a DVD player, a Blu-ray player, a personal computer (PC), a notebook computer, a home theater system, a broadcast receiver, a smart phone, a tablet, and a mobile terminal, a host processor, an application processor, or a graphic processing unit (GPU).

The main processor 70 converts the digital video data DATA into a format suitable for display on the display panel 10 and transmits the digital video data DATA to the timing controller 40. The main processor 70 may receive the touch coordinate data CD from the touch coordinate calculator 60. The main processor 70 executes an application program of an icon existing in the touch coordinates according to the touch coordinate data CD, and transmits the digital video data DATA and the timing signals TS according to the execution program to the timing controller 40.

Figure 2:
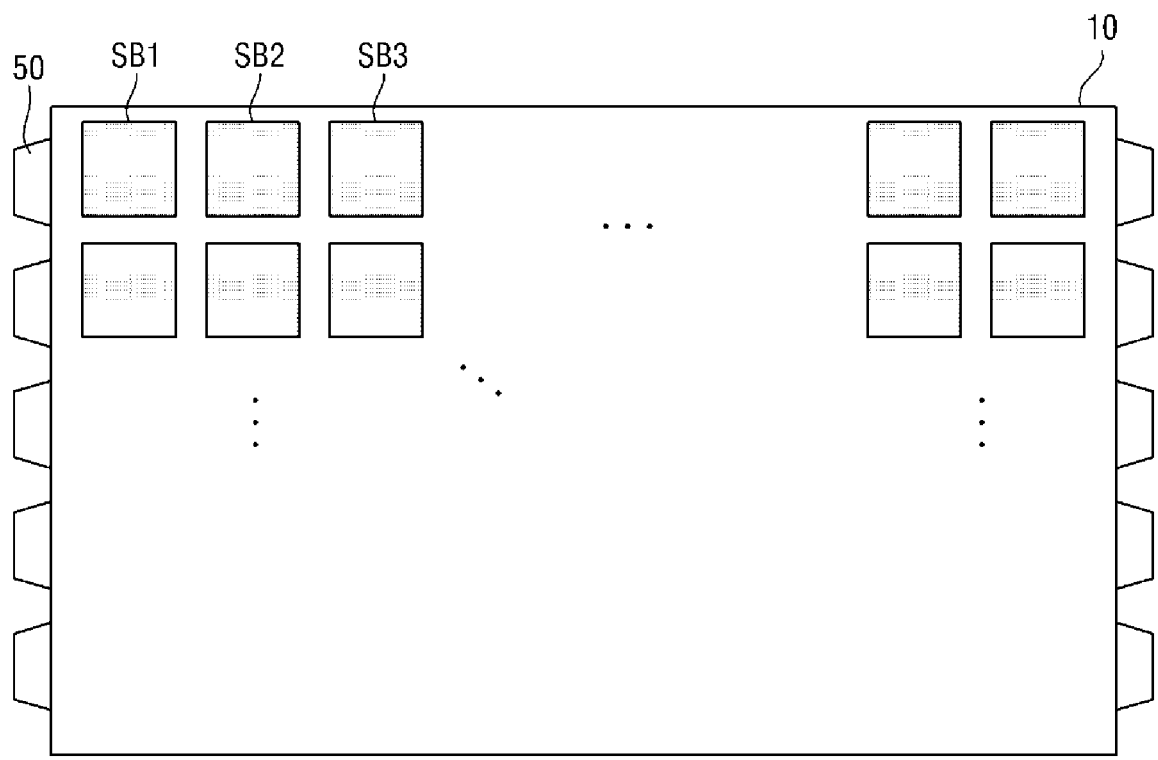
FIG. 2 is a plan view schematically illustrating a display panel and a touch driver of the display device of FIG. 1.
Figure 2:
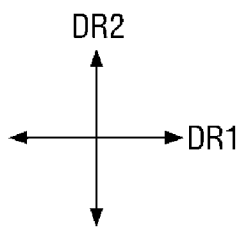
Figure 3:
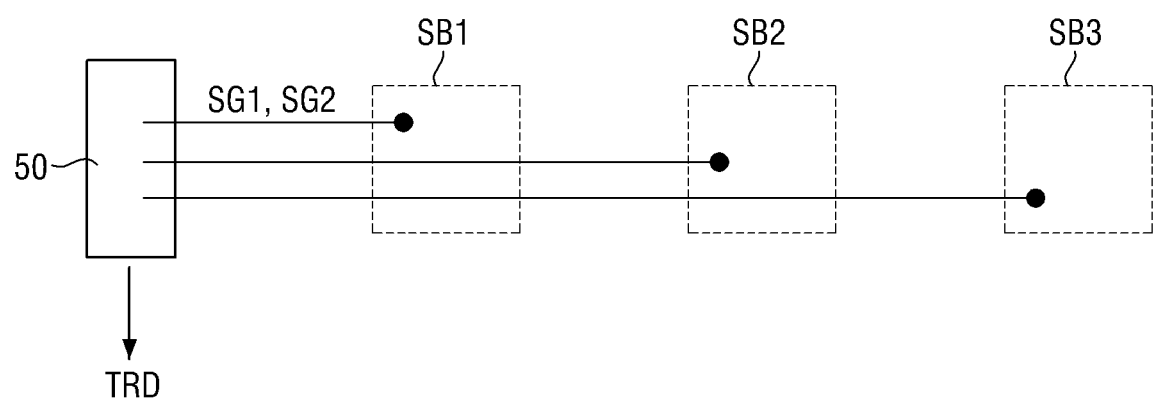
FIG. 3 is a diagram illustrating that a first signal and a second signal are applied to each unit sensing area.

FIG. 2 is a plan view schematically illustrating the display panel 10 and the touch driver 50 of the display device 1 of FIG. 1. FIG. 3 is a diagram illustrating that a first signal SG1 and a second signal SG2 are applied to each unit sensing area.

In embodiments, a first direction DR1 and a second direction DR2 cross each other in different directions. In the plan view of FIG. 1, for convenience of explanation, the second direction DR2 is a vertical direction and the first direction DR1 is a horizontal direction. In the following embodiments, one side of the second direction DR2 refers to an upper direction in the plan view, the other side of the second direction DR2 refers to a lower direction in the plan view, the one side of the first direction DR1 is a right direction in the plan view, and the other side of the first direction DR1 refers to a left direction in the plan view. However, the directions mentioned in the embodiments should be understood to refer to relative directions.

Referring to FIGS. 2 and 3, in the display panel 10 according to an embodiment, a planar shape having a rectangular shape may be applied. When the planar shape of the display panel 10 is applied as a rectangle, the display panel 10 may include long sides extending along the first direction DR1 and short sides extending along the second direction DR2.

The planar shape of the display panel 10 may be applied as a rectangle having long sides extending along the first direction DR1 and short sides extending along the second direction DR2, a square, another polygonal, a circle, or an ellipse. Hereinafter, a case where the planar shape of the display panel 10 is applied as a rectangle having long sides extending along the first direction DR1 and short sides extending along the second direction DR2 will be mainly described.

As shown in FIG. 2, the display panel 10 may include unit sensing areas SB1, SB2, and SB3. The unit sensing areas SB1 to SB3 may be arranged along the matrix directions, e.g., the first direction DR1 and the second direction DR2. Each of the unit sensing areas SB1 to SB3 may have a planar rectangular or square shape.

Each of the unit sensing areas SB1 to SB3 may include sensing electrodes, sensing lines, and connection electrodes. The sensing electrodes and the sensing lines may be arranged on the same layer, and each of the connection electrodes may electrically connect the adjacent sensing lines, and may further electrically connect the adjacent sensing electrodes and sensing lines.

Each of the unit sensing areas SB1 to SB3 may correspond to the pixels P. That is, the size of each of the unit sensing areas SB1 to SB3 in the plan view may be larger than the size of each of the pixels P in the plan view, and the pixels P may be arranged in one unit sensing area.

The touch driver 50 may be disposed on the short side of the display panel 10. A plurality of touch drivers 50 may be provided. The touch drivers 50 may be arranged on the short sides of the display panel 10 along an extension direction, e.g., the second direction DR2.

The touch drivers 50 may be arranged not only on one short side of the display panel 10 in the first direction DR1 but also on the other short side of the display panel 10 in the first direction DR1.

As shown in FIG. 3, the touch driver 50 may apply the first signal SG1 and the second signal SG2 to the unit sensing areas SB1 to SB3. According to an embodiment, the first signal SG1 and the second signal SG2 may be potentiodynamic signals. Moreover, the first signal SG1 and the second signal SG2 may be simultaneously applied to each of the unit sensing areas SB1 to SB3. That is, the first signal SG1 and the second signal SG2 may be synchronous potentiodynamic signals.

As will be described later, the first signal SG1 may be applied to the sensing electrode and the sensing line of the touch member, and the second signal SG2 may be applied to the blocking layer. The blocking layer may cover the sensing electrode and the sensing line on the plane to prevent the sensing electrode and the sensing line from forming a parasitic capacitance together with a common electrode of the upper panel in addition to conductive layers of the lower panel, and may apply synchronous potentiodynamic signals to the sensing electrode and the sensing line of the touch member to prevent an electric potential from being formed between the sensing electrode and the sensing line of the touch member.

Different signals from the first unit sensing area SB1 may be applied to the second unit sensing area SB2 and the third unit sensing area SB3, respectively. For example, the first signal SG1 and the second signal SG2 applied to the second unit sensing area SB2 may be different from the first signal SG1 and the second signal SG2 applied to the first unit sensing area SB1, respectively. The first signal SG1 and the second signal SG2 applied to the third unit sensing area SB3 may be different from the first signal SG1 and the second signal SG2 applied to the first unit sensing area SB1 and the second unit sensing area SB2, respectively.

Figure 5:
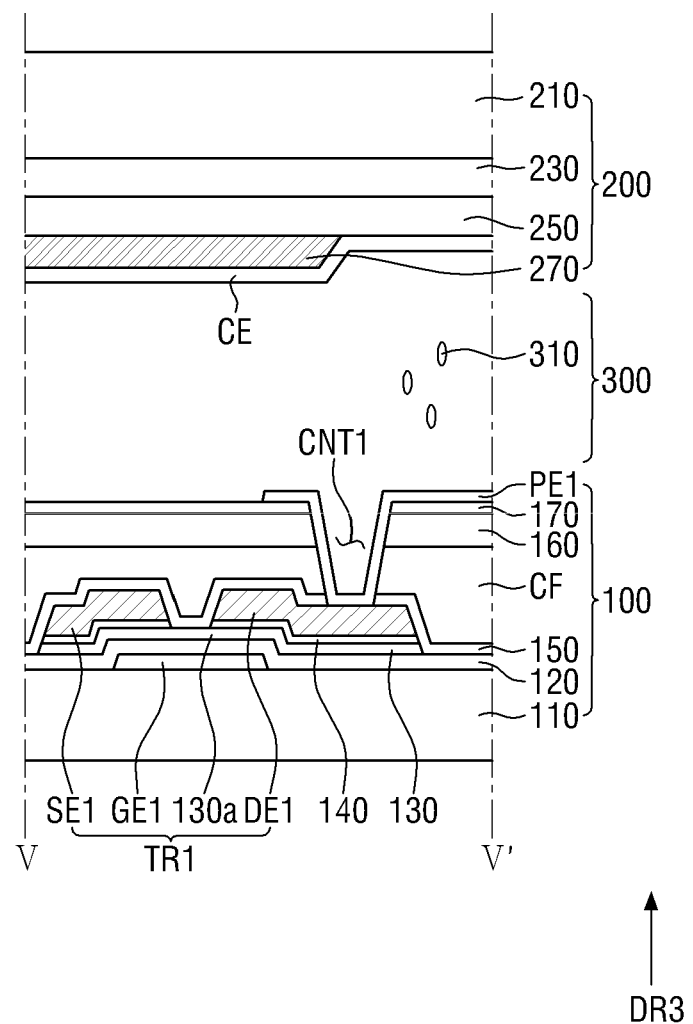
FIG. 5 is a cross-sectional view taken along the line V-V' of FIG. 4.
Figure 6:
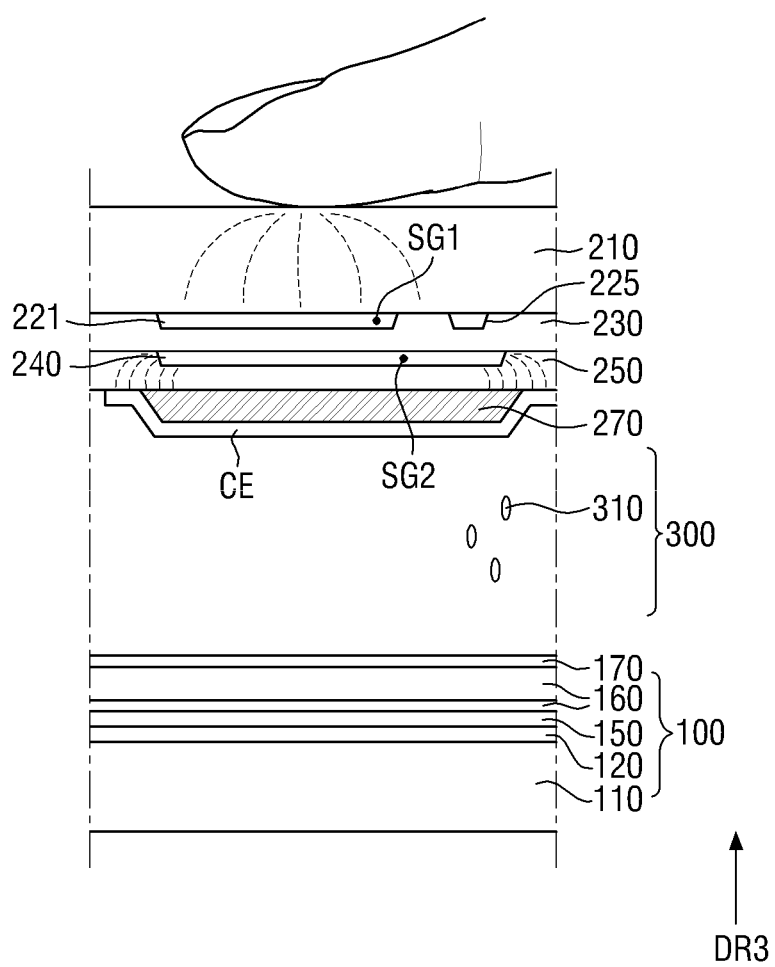
FIG. 6 is a cross-sectional view of an area in which a blocking layer is disposed in a display device according to an embodiment.

FIG. 4 is a layout view specifically illustrating a first pixel P1. FIG. 5 is a cross-sectional view taken along the line V-V' of FIG. 4. FIG. 6 is a cross-sectional view of an area in which a blocking layer 240 is disposed in the display device 1 according to an embodiment.

Referring to FIGS. 4 to 6, a lower panel 100 and an upper panel 200 are disposed to face each other. A liquid crystal layer 300 is interposed between the lower panel 100 and the upper panel 200. The liquid crystal layer 300 may include liquid crystal molecules 310. In an embodiment, the lower panel 100 may be attached to the upper panel 200 through sealing.

First, the lower panel 100 will be described.

The lower panel 100 may include a first substrate 110, a first conductive layer, a gate insulating layer 120, a semiconductor layer 130, an interlayer insulating layer 140, a second conductive layer, and a first passivation layer 150, a color filter CF, an organic insulating layer 160, a second passivation layer 170, and a first pixel electrode PE1.

In an embodiment, the first substrate 110 may be a transparent insulating substrate.

Here, the transparent insulating substrate may include a glass material, a quartz material, or a transparent plastic material. In an embodiment, the first substrate 110 may be a flexible substrate, or may have a shape in which films and the like are stacked.

The first conductive layer may be disposed on the first substrate 110. The first conductive layer may include gate lines G1 to Gn, where n is a positive integer of 2 or more, including a first gate line G1, and a first gate electrode GE1.

The first gate electrode GE1 is directly connected to the first gate line G1. The first gate electrode GE1 may extend in the direction of the channel region 130a from the first gate line G1.

The first conductive layer may formed as a single film including any one conductive metal selected from aluminum (Al), copper (Cu), molybdenum (Mo), chromium (Cr), titanium (Ti), tungsten (W), molytungsten (MoW), molytitanium (MoTi), and copper/molytitanium (Cu/MoTi), a double film including two conductive metals selected therefrom, or a triple film including three conductive metals selected therefrom. The conductive lines included in the first conductive layer may be simultaneously formed through the same mask process.

The gate insulating layer 120 may be disposed on the first conductive layer. In an embodiment, the gate insulating layer 120 may be formed of silicon nitride, silicon oxide, or the like. The gate insulating layer 120 may have a multi-film structure including at least two insulating layers having different physical properties.

The semiconductor layer 130 may be disposed on the gate insulating layer 120. The semiconductor layer 130 may include the channel region 130a and source/drain regions located at one side and the other side of the channel region 130a. The channel region 130a of the semiconductor layer 130 may overlap the first gate electrode GE1 along a third direction DR3, and the source/drain regions of the semiconductor layer 130 may be electrically connected to source/drain electrodes SE1/DE1 of the second conductive layer, which will be described later.

The semiconductor layer 130 may be disposed on the gate insulating layer 120. In an embodiment, the semiconductor layer 130 may be formed of amorphous silicon, polycrystalline silicon, or the like. In another embodiment, the semiconductor layer 130 may include an oxide semiconductor. When the semiconductor layer 130 includes an oxide semiconductor, the semiconductor layer 130 may be formed of any one selected from In—Ga-Zinc-Oxide (IGZO), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$.

The channel region 130a of the semiconductor layer 130 may form a channel region of the first transistor TR1.

The interlayer insulating layer 140 may be further disposed on the semiconductor layer 130. The interlayer insulating layer 140 may include at least one of the above-described materials of the gate insulating layer 120.

The second conductive layer may be disposed on the interlayer insulating layer 140. The second conductive layer may include data lines including a first data line D1, the first source electrode SE1, and the first drain electrode DE1.

The first source electrode SE1 may be branched from the first data line D1 to at least partially overlap the first gate electrode GE1. The first drain electrode DE1 may overlap the first gate electrode GE1, but may be spaced apart from the first source electrode SE1 by a predetermined distance. At least a part of the first drain electrode DE1 may be exposed to the outside through a first contact hole CNT1 to be in contact with the first pixel electrode PE1.

It is shown in FIG. 4 that the shape of the first source electrode SE1 is U-shaped and the first drain electrode DE1 is surrounded by the first source electrode SE1. The first source electrode SE1, the first drain electrode DE1, the channel region 130a, and the first gate electrode GE1 form the above-described first transistor TR1.

The second conductive layer may formed as a single film including any one conductive metal selected from aluminum (Al), copper (Cu), molybdenum (Mo), chromium (Cr), titanium (Ti), tungsten (W), molytungsten (MoW), molytitanium (MoTi), and copper/molytitanium (Cu/MoTi), a double film including two conductive metals selected the conductive metals, or a triple film including three conductive metals selected the conductive metals. However, the second conductive layer may be made of various metals or conductors. In an embodiment, the second conductive layer may be simultaneously formed through the same mask process.

The first passivation layer 150 may be disposed on the second conductive layer. The first passivation layer 150 includes an opening that extends to and exposes at least a part of the first drain electrode DEl In an embodiment, the first passivation layer 150 may be formed of an inorganic insulating material such as silicon nitride or silicon oxide. The first passivation layer 150 may prevent a pigment of the organic insulating layer 160, which will be described later, from flowing into the semiconductor layer 130.

The color filter CF may be disposed on the first passivation layer 150. The light passing through the color filter CF may display one of three primary colors such as red, green, and blue. However, the display color of the light passing through the color filter may be any one of cyan, magenta, yellow, and white-based colors. The color filter CF may be formed of a material displaying different colors for each adjacent pixel.

The color filter CF is disposed to overlap pixel electrodes.

The organic insulating layer 160 may be disposed on the first passivation layer 150 and the color filter CF. The organic insulating layer 160 may have excellent planarization characteristics, and may include an organic material having photosensitivity. The organic insulating layer 160 may be omitted.

The second passivation layer 170 may be disposed on the organic insulating layer 160. In an embodiment, the second passivation layer 170 may be formed of an inorganic insulating material such as silicon nitride or silicon oxide. The second passivation layer 170 may be omitted.

The first pixel electrode PE1 may be disposed on the second passivation layer 170. The first pixel electrode PE1 may include a transparent conductive material. Here, the transparent conductive material may include polycrystalline, monocrystalline, or amorphous indium tin oxide (ITO). Meanwhile, unlike that shown in the drawing, the first pixel electrode PE1 may include slits.

The first pixel electrode PE1 may be disposed not to overlap a black matrix 270 of the upper panel 200, which will be described later, along the third direction DR.

The first pixel electrode PE1 may be disposed for each pixel P, and may not be disposed over the entire pixel P. The pixel electrodes arranged for each pixel P may be spaced apart from each other.

A first alignment film may be disposed on the first pixel electrode PE1. The first alignment film may induce an initial alignment of the liquid crystal molecules 310 in the liquid crystal layer 300. In an embodiment, the first alignment film may include an organic polymer material having an imide group in a repeating unit of a main chain.

Next, the upper panel 200 will be described.

A second substrate 210 is disposed to face the first substrate 110. The second substrate 210 may be formed of transparent glass, plastic, or the like, and may be formed of the same material as the first substrate 110.

A third passivation layer 230 may be disposed on the second substrate 210. The material of the third passivation layer 230 may include an organic material or an inorganic material.

A fourth passivation layer 250 may be disposed on the third passivation layer 230. The material of the fourth passivation layer 250 may include an organic material or an inorganic material.

The black matrix 270 may be disposed on the second substrate 210. The black matrix 270 may be disposed on the third passivation layer 230 and/or the fourth passivation layer 250.

The black matrix 270 may not overlap the first pixel electrode PE1 of the lower panel 100, and may block the transmission of light in an area where the first pixel electrode PE1 is not disposed. The material of the black matrix 270 is not particularly limited as long as it can block light. In an embodiment, the black matrix 270 may be formed of a photosensitive composition, an organic material, a metallic material, or the like. In an embodiment, the photosensitive composition may include a binder resin, a polymerizable monomer, a polymerizable oligomer, a pigment, a dispersant, and the like. The metallic material may include chromium or the like.

A common electrode CE may be disposed on the black matrix 270. Unlike the first pixel electrode PE1, the common electrode CE may be disposed over the entire surface of the black matrix 270 in a planar shape irrespective of each pixel P.

The common electrode CE may be disposed on the black matrix 270 and the passivation layers 230 and 250. The common electrode CE may be conformally disposed to reflect a step caused by the black matrix 270.

In an embodiment, the common electrode CE may include a transparent conductive material such as ITO and IZO.

A second alignment film may be disposed on the common electrode CE. The second alignment film may induce an initial alignment of the liquid crystal molecules 310 in the liquid crystal layer 300. In an embodiment, the second alignment film may be formed of the same material as the first alignment film.

Next, the liquid crystal layer 300 will be described.

The liquid crystal layer 300 includes liquid crystal molecules 310. In an embodiment, the liquid crystal molecules 310 may have negative dielectric anisotropy, and may be vertically aligned in an initial alignment state. The liquid crystal molecules 310 may have a predetermined pretilt angle in the initial alignment state. The initial alignment of the liquid crystal molecules 310 may be induced by the aforementioned first and second alignment films. When an electric field is formed between the lower panel 100 and the upper panel 200, the liquid crystal molecules 310 may tilt or rotate in a specific direction, thereby changing polarization state of the light passing through the liquid crystal layer 300.

Referring to FIG. 6, a touch member may be disposed on the second substrate 210. The touch member may include a sensing electrode 221 and a sensing line 225. The sensing electrode 221 and the sensing line 225 may be disposed between the second substrate 210 and the third passivation layer 230.

The sensing electrode 221 and the sensing wiring 225 may include an opaque conductive material. The sensing electrode 221 and the sensing line 225 may include the same material, and may be formed by the same process.

The third passivation layer 230 may cover and protect the sensing electrode 221 and the sensing line 225.

The blocking layer 240 may be disposed on the third passivation layer 230. The blocking layer 240 may be disposed between the third passivation layer 230 and the fourth passivation layer 250. The blocking layer 240 may be disposed to overlap the sensing electrode 221 and the sensing line 225 along the third direction DR3. The blocking layer 240 may overlap the sensing electrode 221 and the sensing line 225 so as to completely cover the sensing electrode 221 and the sensing line 225 along the third direction DR3.

The blocking layer 240 may include a low-reflectance conductive material. For example, the low-reflectance conductive material may be a transparent conductive material such as ITO or IZO.

As described above, the first signal SG1 may be applied to the sensing electrode 221 and sensing line 225 of the touch member, and the second signal SG2 may be applied to the blocking layer 240. The blocking layer 240 may cover the sensing electrode 221 and the sensing line 225 on the plane to prevent the sensing electrode 221 and the sensing line 225 from forming a parasitic capacitance together with the common electrode CE of the upper panel 200 in addition to the conductive layers of the lower panel 100, and may apply synchronous potentiodynamic signals to the sensing electrode 221 and sensing line 225 of the touch member to prevent an electric potential from being formed between the sensing electrode 221 and sensing line 225 of the touch member.

The black matrix 270 may be disposed to completely overlap the sensing electrode 221, the sensing line 225, and the blocking layer 240 along the third direction DR3. The cross-sectional width of the black matrix 270 may be greater than the cross-sectional width of each of the sensing electrode 221, the sensing wiring 225, and the blocking layer 240, and thus the black matrix 270 may completely overlap the sensing electrode 221, the sensing line 225, and the blocking layer 240.

Figure 7:
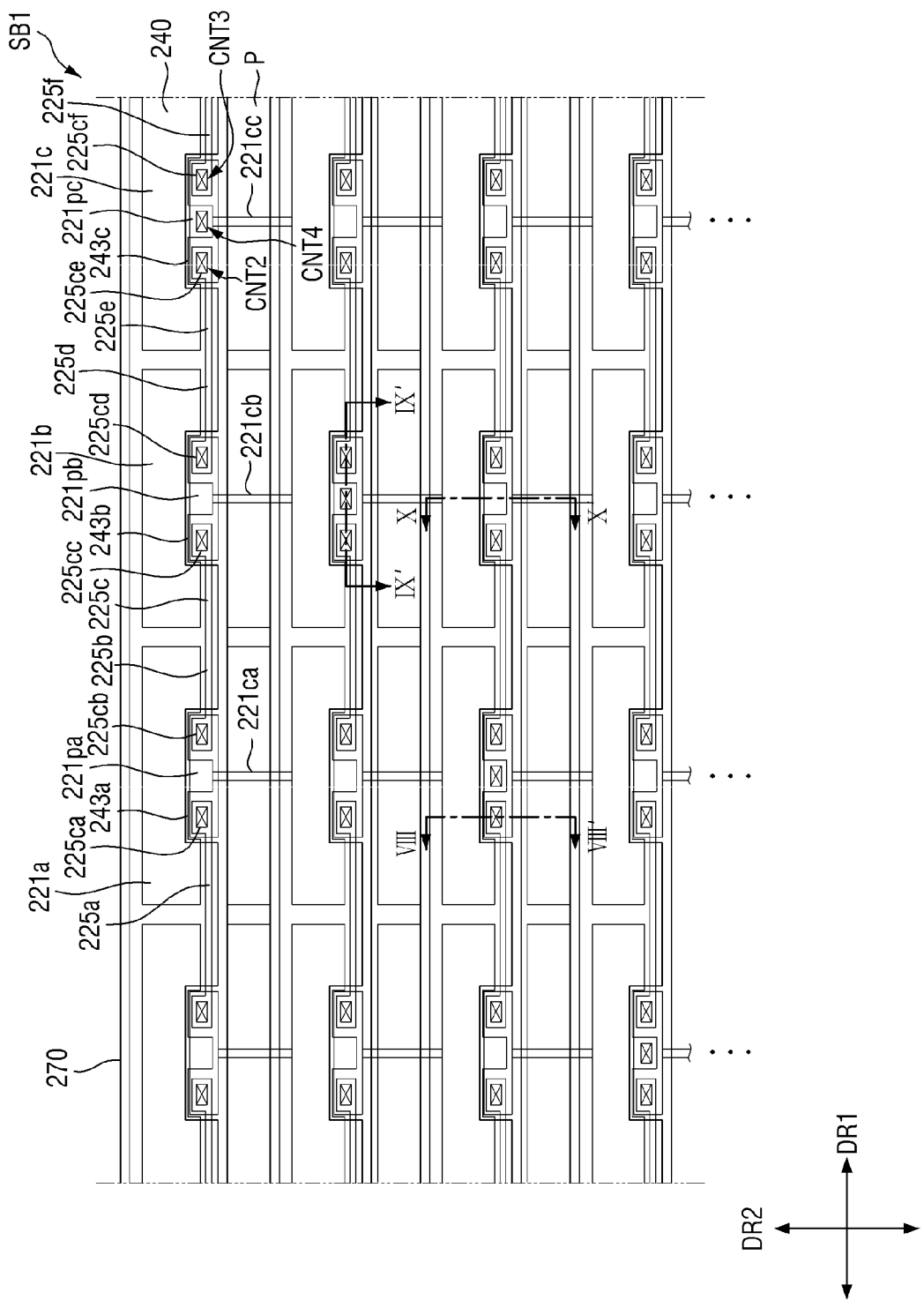
FIG. 7 is a layout view specifically illustrating the first unit sensing area of FIG. 2.
Figure 8:
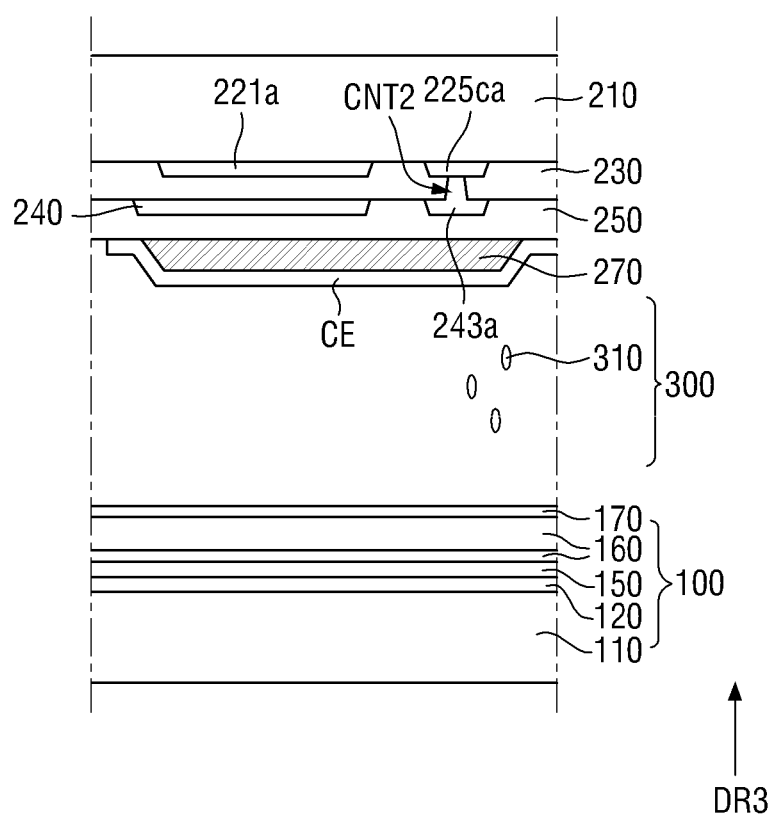
FIG. 8 is a cross-sectional view taken along the line VIII-VIII' of FIG. 7.
Figure 9:
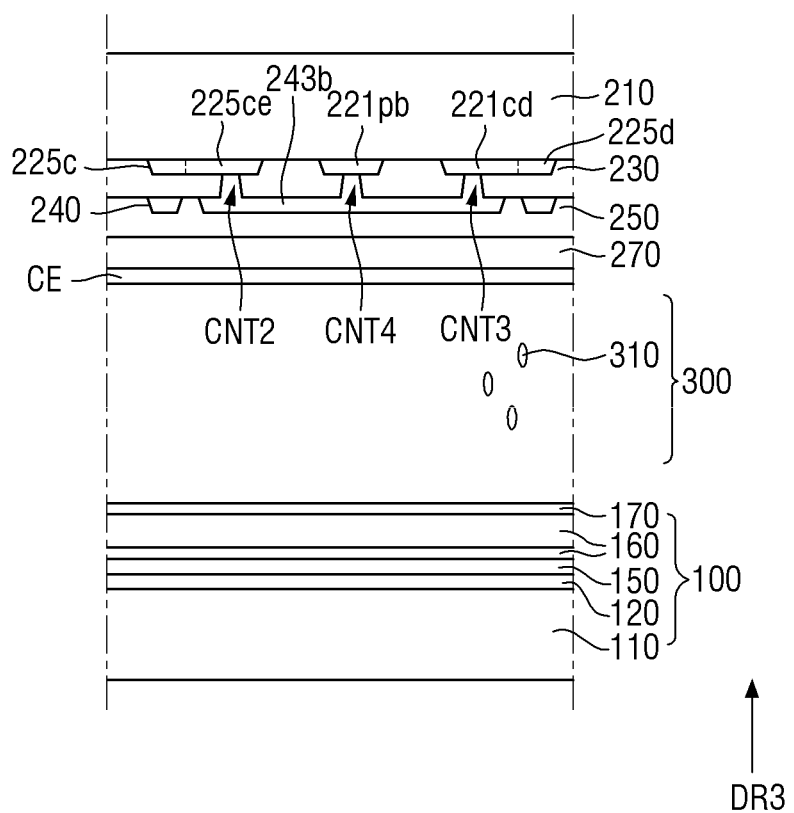
FIG. 9 is a cross-sectional view taken along the line IX'-IX' of FIG. 7.
Figure 10:
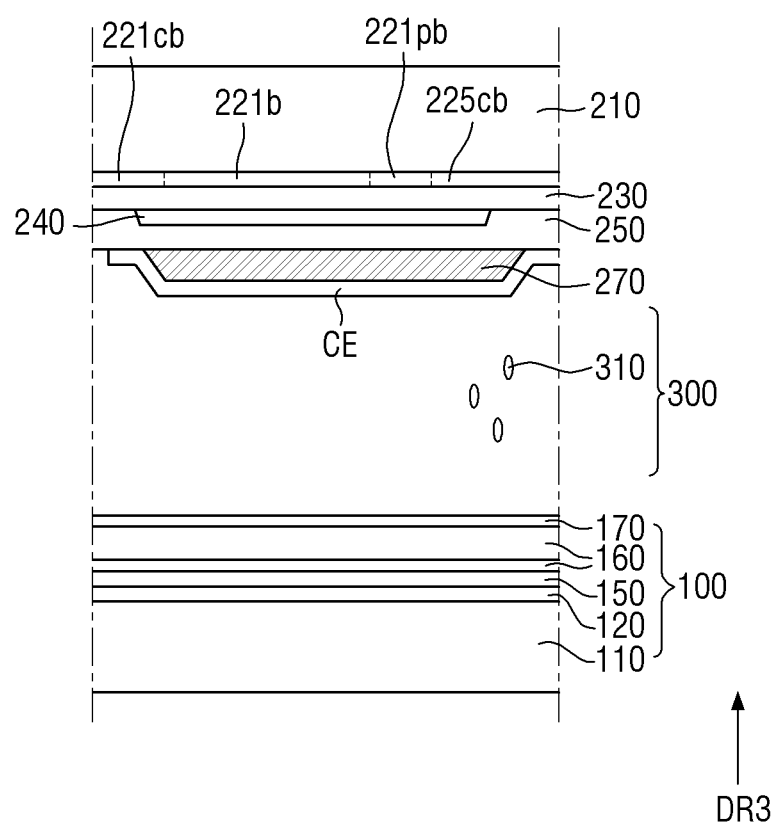
FIG. 10 is a cross-sectional view taken along the line X-X' of FIG. 7.

FIG. 7 is a layout view specifically illustrating the first unit sensing area of FIG. 2. FIG. 8 is a cross-sectional view taken along the line VIII-VIII' of FIG. 7. FIG. 9 is a cross-sectional view taken along the line IX'-IX' of FIG. 7. FIG. 10 is a cross-sectional view taken along the line X-X' of FIG. 7.

Referring to FIGS. 7 to 10, the first unit sensing area SB1 may include sensing electrodes 221a, 221b, 221c, 221pa, 221pb, 221pc, 221ca, 221cb, and 221cc, and sensing lines 225ca, 225cb, 225cc, 225cd, 225ce, 225cf, 225a, 225b, 225c, 225d, 225e, and 225f respectively connected to the sensing electrodes 221a, 221b, 221c, 221pa, 221pb, 221pc, 221ca, 221cb, and 221cc.

The sensing electrodes 221a, 221b, 221c, 221pa, 221pb, 221pc, 221ca, 221cb, and 221cc arranged in the first unit sensing area SB1 may all be electrically connected. The sensing lines 225ca, 225cb, 225cc, 225cd, 225ce, 225cf, 225a, 225b, 225c, 225d, 225e, and 225f arranged in the first unit sensing area SB1 may all be electrically connected. The sensing electrodes 221a, 221b, 221c, 221pa, 221pb, 221pc, 221ca, 221cb, and 221cc and the sensing lines 225ca, 225cb, 225cc, 225cd, 225ce, 225cf, 225a, 225b, 225c, 225d, 225e, and 225f, which are arranged in the first unit sensing area SB1, may all be electrically connected.

First, the sensing electrodes 221a, 221b, 221c, 221pa, 221pb, 221pc, 221ca, 221cb, and 221cc may include first sensing electrodes 221a, 221ca, and 221pa. The first sensing electrodes 221a, 221ca, and 221pa may include a first sensing main electrode 221a, a first sensing protrusion electrode 221pa protruding from the first sensing main electrode 221a toward the other side of the second direction DR2, and a first sensing connection electrode 221ca extending from the first sensing protrusion electrode 221pa toward the other side of the second direction DR2. One edge of the other side of the first sensing main electrode 221a in the second direction DR2 may be recessed toward one side of the second direction DR2, and the first sensing protrusion electrode 221pa may be disposed in the corresponding recessed region.

The first sensing electrodes 221a, 221ca, and 221pa may be repeatedly arranged along the first direction DR1. For example, second sensing electrodes 221b, 221cb, and 221pb may be arranged at one side of the first sensing electrodes 221a, 221ca, and 221pa in the first direction DR1. and third sensing electrodes 221c, 221cc, and 221pc may be arranged at one side of the second sensing electrodes 221b, 221cb, and 221pb in the first direction DR1.

Moreover, the sensing electrodes 221a, 221b, 221c, 221pa, 221pb, 221pc, 221ca, 221cb, and 221cc may be repeatedly arranged along the second direction DR2.

The electrical connection of the sensing electrodes 221a, 221b, 221c, 221pa, 221pb, 221pc, 221ca, 221cb, and 221cc in the first direction DR1 may be formed through the sensing lines 225ca, 225cb, 225cc, 225cd, 225ce, 225cf, 225a, 225b, 225c, 225d, 225e, and 225f. The electrical connection of the sensing electrodes 221a, 221b, 221c, 221pa, 221pb, 221pc, 221ca, 221cb, and 221cc in the second direction DR2 may be formed through the sensing connection electrodes 221ca, 221cb, and 221cc of the sensing electrodes 221a, 221b, 221c, 221pa, 221pb, 221pc, 221ca, 221cb, and 221cc. That is, the first sensing connection electrode 221ca may physically connect the first sensing main electrode 221a adjacent to the other side of the second direction DR2 and the first sensing protrusion electrode 221pa adjacent to one side of the second direction DR2 to short the first sensing main electrode 221a and the first sensing protrusion electrode 221pa. Since the second sensing connection electrode 221cb and the third sensing connection electrode 221cc also have the same function as the above-described first sensing connection electrode 221ca, redundant description will be omitted.

Subsequently, explaining the sensing lines 225ca, 225cb, 225cc, 225cd, 225ce, 225cf, 225a, 225b, 225c, 225d, 225e, and 225f, the sensing lines 225ca, 225cb, 225cc, 225cd, 225ce, 225cf, 225a, 225b, 225c, 225d, 225e, and 225f may extend along the first direction DR1. The sensing lines 225ca, 225cb, 225cc, 225cd, 225ce, 225cf, 225a, 225b, 225c, 225d, 225e, and 225f may include first sensing lines 225ca, 225cb, 225a, and 225b adjacent to the other side of the first sensing electrodes 221a, 221ca, and 221pa in the second direction DR2. The first sensing lines 225ca, 225cb, 225a, and 225b may include a first extension sensing portion 225a, a first expansion sensing portion 225ca, a second expansion sensing portion 225cb, and a second expansion sensing portion 225b, which are sequentially arranged along the first direction DR1. The first extension sensing portion 225a may be physically connected to the sensing lines of the other side of the first sensing lines 225ca, 225cb, 225a, and 225b in the first direction DR1, and the second extension sensing portion 225b may be physically connected to the sensing lines, e.g., the second sensing lines 225cc, 225cd, 225c, and 225d, of one side of the first sensing lines 225ca, 225cb, 225a, and 225b in the first direction DR1. The first expansion sensing portion 225ca and the second expansion sensing portion 225cb may be physically connected to the first extension sensing portion 225a and the second extension sensing portion 225b, respectively. In a plan view, the first expansion sensing portion 225ca and the second expansion sensing portion 225cb may be spaced apart from each other along the first direction DR1. The width of the first expansion sensing portion 225ca and the second expansion sensing portion 225 in the second direction DR2 may be greater than the width of the first extension sensing portion 225a and the second extension sensing portion 225b in the second direction DR2. Thus, the contact area with the connection electrode 243a may be increased to make the contact easier.

In a plan view, the first expansion sensing portion 225ca, the second expansion sensing portion 225cb, and the first sensing protrusion electrode 221pa may be aligned along the first direction DR1.

The connection electrode 243a may be disposed on the first expansion sensing portion 225ca, the second expansion sensing portion 225cb, and the first sensing protrusion electrode 221pa, which are aligned along the first direction DR1. Similarly, the connection electrodes 243b and 243c may be disposed on the expansion sensing portions 225cc, 225cd, 225ce, and 225cf and the sensing protrusion electrodes 221pb and 221pc, which are aligned along the first direction DR1. The connection electrodes 243a, 243b, and 243c may be located on a different layer from the sensing electrodes 221a, 221b, 221c, 221pa, 221pb, 221pc, 221ca, 221cb, and 221cc and the sensing lines 225ca, 225cb, 225cc, 225cd, 225ce, 225cf, 225a, 225b, 225c, 225d, 225e, and 225f. The connection electrodes 243a, 243b, and 243c may be located on the same layer as the blocking layer 240.

The extension sensing portions 225a to 225f may not overlap the blocking layer 240 in a plan view. However, the extension sensing portions 225a to 225f may partially overlap the blocking layer 240 in a plan view.

The connection electrodes 243a, 243b, and 243c may include the same material as the blocking layer 240, sometimes called the shielding layer 240, and may be formed in the same process.

As shown in FIGS. 7, 8, and 9, the connection electrodes 243a, 243b, and 243c may be electrically connected to the expansion sensing portions 225ca, 225cb 225cc, 225cd, 225ce, and 225cf through first and second contact holes CNT2 and CNT3 passing through the third passivation layer 230 along the third direction DR3, respectively.

Moreover, as shown in FIG. 9, the connection electrodes 243a, 243b, and 243c may be electrically connected to the sensing protrusion electrodes 221pa, 221pb, and 221pc through a fourth contact hole CNT4 passing through the third passivation layer 230 along the third direction DR3. The fourth contact hole CNT4 may overlap the sensing protrusion electrodes 221pa, 221pb, and 221pc in a plan view.

Meanwhile, as shown in FIG. 7, the fourth contact hole CNT4 does not need to be formed in all of the sensing protrusion electrodes 221pa, 221pb, and 221pc. For example, the fourth contact hole CNT4 may be formed only in at least one of the sensing protrusion electrodes 221pa, 221pb, and 221pc arranged along the first direction DR1. In this case, since the sensing electrodes 221a, 221b, 221c, 221pa, 221pb, 221pc, 221ca, 221cb, and 221cc and the sensing lines 225ca, 225cb, 225cc, 225cd, 225ce, 225cf, 225a, 225b, 225c, 225d, 225e, and 225f are electrically connected to each other, there may be no problem with energization. However, at least one fourth contact hole CNT4 is required for each row.

The blocking layer 240 may extend along the first direction DR1 in a plan view to completely cover the sensing electrodes 221a, 221b, 221c, 221pa, 221pb, 221pc, 221ca, 221cb, and 221cc, the sensing lines 225ca, 225cb, 225cc, 225cd, 225ce, 225cf, 225a, 225b, 225c, 225d, 225e, and 225f, and the connection electrodes 243a, 243b, and 243c, which are arranged along the row. That is, the blocking layer 240 may be disposed to overlap the row of the sensing electrodes 221a, 221b, 221c, 221pa, 221pb, 221pc, 221ca, 221cb, and 221cc, which are arranged along the row.

The sensing electrodes 221a, 221b, 221c, 221pa, 221pb, 221pc, 221ca, 221cb, and 221cc, which are arranged along the row, may be arranged along the second direction DR2. The sensing electrodes 221a, 221b, 221c, 221pa, 221pb, 221pc, 221ca, 221cb, and 221cc adjacent to each other along the second direction DR2 may be spaced apart from each other with a space therebetween.

The blocking layer 240 may not overlap the space between the sensing electrodes 221a, 221b, 221c, 221pa, 221pb, 221pc, 221ca, 221cb, and 221cc adjacent to each other along the second direction DR2.

The blocking layers 240 may be disposed along the second direction DR2. The blocking layers 240 adjacent to each other along the second direction DR2 may be physically spaced apart from each other.

The black matrix 270 may extend along the first direction DR1 in a plan view to completely cover the blocking layer 240, the sensing electrodes 221a, 221b, 221c, 221pa, 221pb, 221pc, 221ca, 221cb, and 221cc, the sensing lines 225ca, 225cb, 225cc, 225cd, 225ce, 225cf, 225a, 225b, 225c, 225d, 225e, and 225f, and the connection electrodes 243a, 243b, and 243c, which are arranged along the row.

The black matrix 270 may not overlap the space between the sensing electrodes 221a, 221b, 221c, 221pa, 221pb, 221pc, 221ca, 221cb, and 221cc adjacent to each other along the second direction DR2.

The black matrices 270 may be disposed along the second direction DR2. The black matrices 270 adjacent to each other along the second direction DR2 may be physically spaced apart from each other.

As described above, the first signal SG1 may be applied from the touch driver 50 to the sensing electrode 221 and sensing line 225 of the touch member, and the second signal SG2 may be applied from the touch member to the blocking layer 240. The blocking layer 240 may cover the sensing electrode 221 and the sensing line 225 on the plane to prevent the sensing electrode 221 and the sensing line 225 from forming a parasitic capacitance together with the common electrode CE of the upper panel 200 in addition to the conductive layers of the lower panel 100, and may apply synchronous potentiodynamic signals to the sensing electrode 221 and sensing line 225 of the touch member to prevent an electric potential from being formed between the sensing electrode 221 and sensing line 225 of the touch member. Thus, it is possible to prevent the touch sensitivity of the touch member from being deteriorated by the parasitic capacitance.

Hereinafter, a method of manufacturing a display device according to embodiments will be described. In the following embodiments, the same components as those of the already described embodiments are referred to by the same reference numerals, and description of the components will be omitted or simplified.

Figure 11:
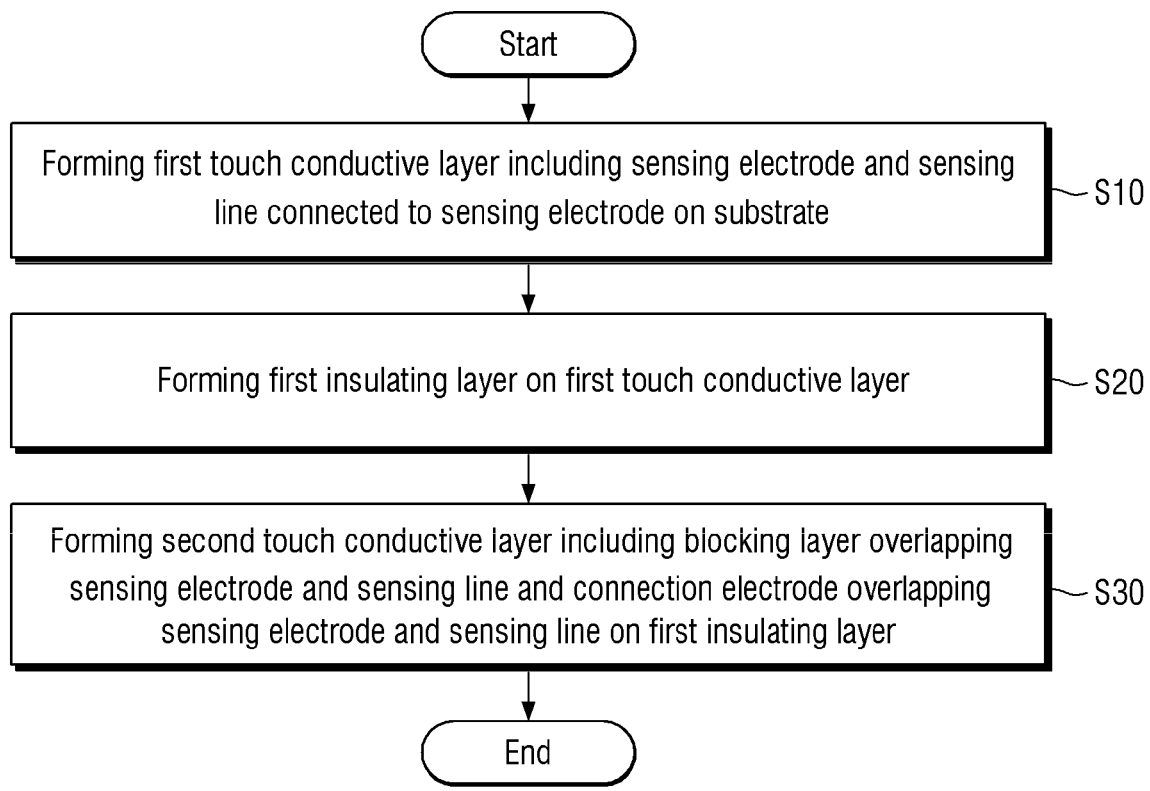
FIG. 11 is a flowchart illustrating a method of manufacturing a display device according to an embodiment.

FIG. 11 is a flowchart illustrating a method of manufacturing a display device according to an embodiment. FIGS. 12 to 17 are cross-sectional views of processes in the method of manufacturing a display device according to an embodiment.

Figure 12:
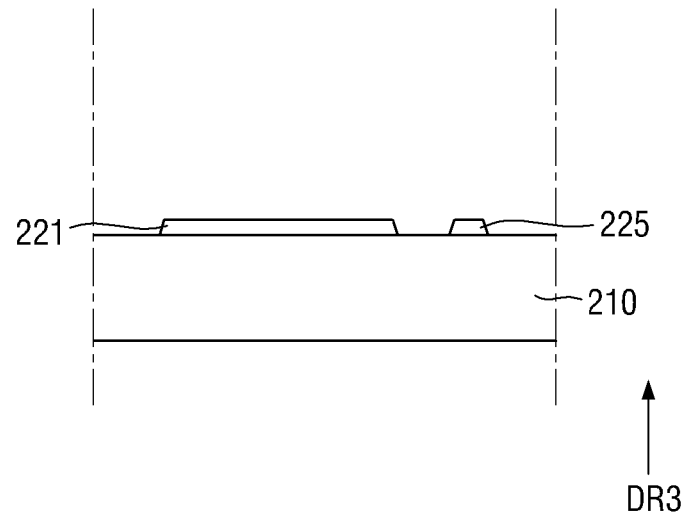
FIGS. 12, 13, 14, 15, 16, and 17 are cross-sectional views of processes in the method of manufacturing a display device according to an embodiment.

Referring to FIGS. 11 and 12, a first touch conductive layer including a sensing electrode 221 and a sensing line 225 is formed on a second substrate 210 in an operation S10.

As described above with reference to FIG. 7, the adjacent sensing electrode 221 and sensing line 225 may be electrically connected to each other through the connection electrodes 243a, 243b, and 243c. Hereinafter, redundant description will be omitted.

The sensing electrode 221 and the sensing line 225 may be directly formed on the second substrate 210.

The sensing electrode 221 and the sensing line 225 may include an opaque conductive material. The sensing electrode 221 and the sensing line 225 may include the same material and may be formed by the same process.

Figure 13:
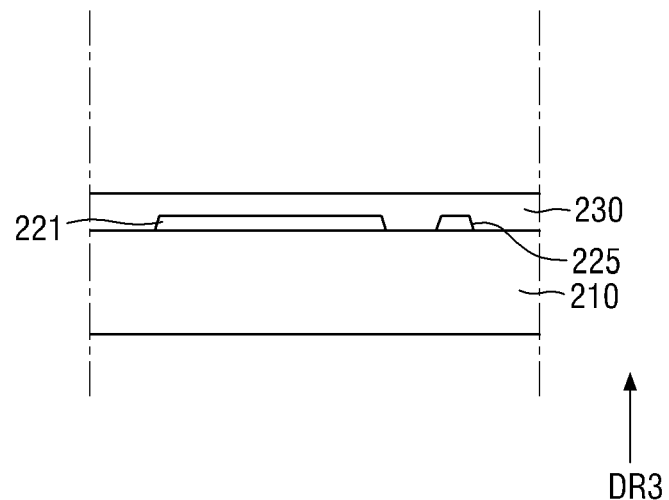
Figure 14:
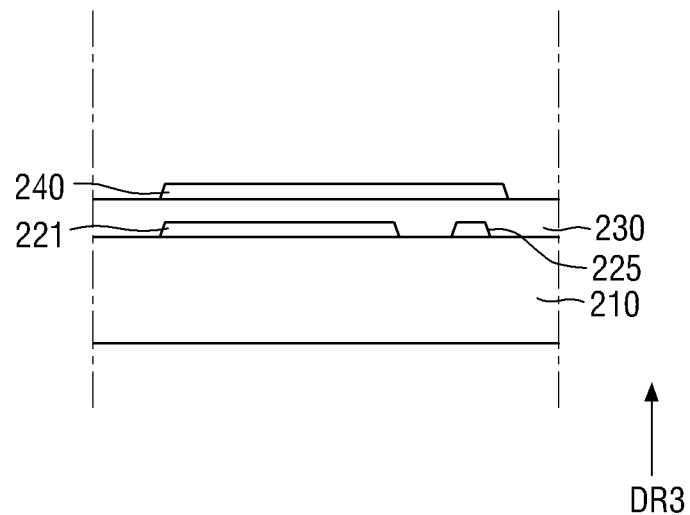

Subsequently, referring to FIGS. 11 and 13, a first insulating layer 230 is formed on the first touch conductive layer in an operation S20. The first insulating layer 230 may be the third passivation layer 230 described above with reference to FIG. 5. Since the material and function of the third passivation layer 230 have been described as above, a redundant description will be omitted.

The first insulating layer 230 may cover and protect the sensing electrode 221 and the sensing wiring 225.

Subsequently, referring to FIGS. 11, 14, and FIGS. 7 to 10, a second touch conductive layer including a blocking layer 240 overlapping the sensing electrode 221 and the sensing line 225 and connection electrodes, e.g., refer to the connection electrodes 243a to 243c, overlapping the sensing electrode 221 and the sensing line 225 is formed on the first insulating layer 230 in an operation S30.

Since the blocking layer 240 and the connection electrodes 243a to 243c and the relationship between the sensing electrode 221 and the sensing wiring 225 have been described above with reference to FIGS. 7 to 10, a redundant description will be omitted.

Figure 15:
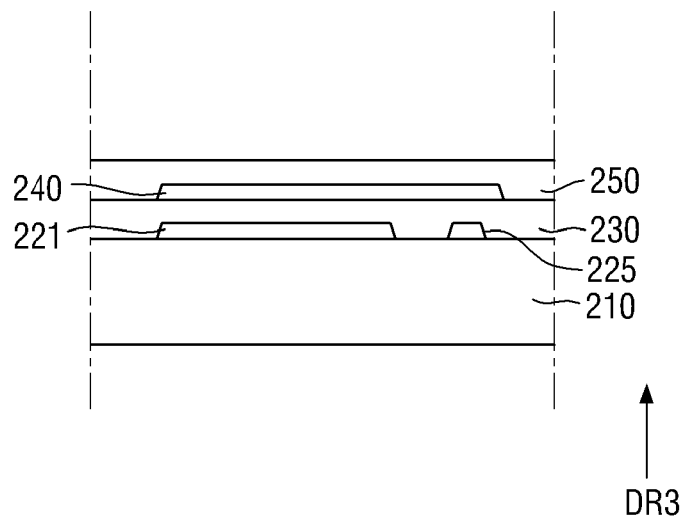

Subsequently, referring to FIG. 15, a second insulating layer 250 is formed on the blocking layer 240 and the connection electrodes 243a to 243c. Since the second insulating layer 250 is substantially the same as the fourth passivation layer 250 of FIG. 5, a redundant description will be omitted.

Figure 16:
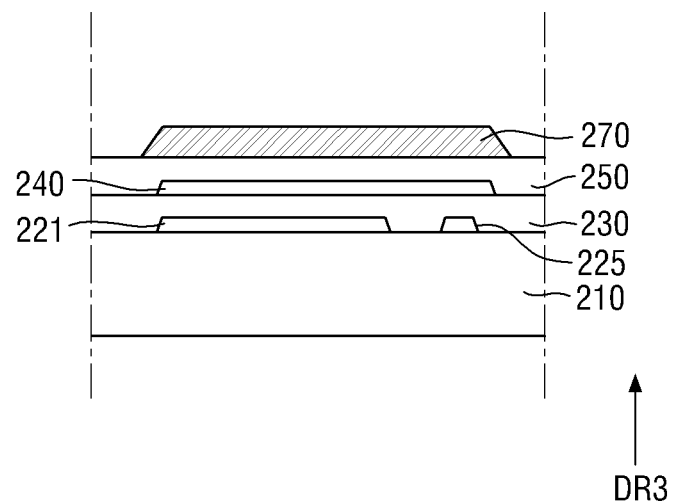

Subsequently, referring to FIGS. 5 and 6 together with FIG. 16, the black matrix 270 is formed on the second insulating layer 250.

The black matrix 270 may not overlap the first pixel electrode PE1 of the lower panel 100, and may block the transmission of light in an area where the first pixel electrode PE1 is not disposed. The material of the black matrix 270 is not particularly limited as long as it can block light. In an embodiment, the black matrix 270 may be formed of a photosensitive composition, an organic material, a metallic material, or the like. In an embodiment, the photosensitive composition may include a binder resin, a polymerizable monomer, a polymerizable oligomer, a pigment, a dispersant, and the like. The metallic material may include chromium or the like.

Figure 17:
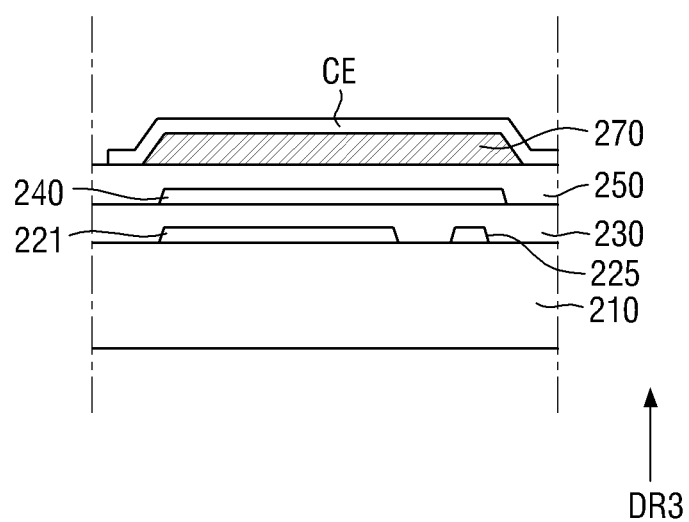

Subsequently, referring to FIG. 17, a common electrode CE is formed on the black matrix 270 and the second insulating layer 250. Unlike the first pixel electrode PE1, the common electrode CE may be disposed over the entire surface of the black matrix 270 and the second insulating layer 250 in a planar shape irrespective of each pixel P.

The common electrode CE may be conformally formed so as to reflect a step caused by the black matrix 270.

The common electrode CE may include a transparent conductive material such as ITO or IZO.

According to the display device and the manufacturing method of the display device, an influence of an electric field between a sensing electrode and a lower panel can be reduced.

Although the embodiments of the inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. A display device, comprising:
a lower panel including a first substrate and at least one transistor disposed on the first substrate; and
an upper panel facing the lower panel and including a first touch conductive layer including a second substrate, sensing electrodes disposed on the second substrate and including a first sensing electrode, and sensing lines including a first sensing line and a second sensing line, a first insulating layer disposed on the first touch conductive layer, and a second touch conductive layer disposed on the first insulating layer including a blocking layer overlapping the sensing electrodes and the sensing lines and a connection electrode overlapping the first sensing electrode, the first sensing line, and the second sensing line,
wherein the connection electrode is electrically connected to the first sensing line and the second sensing line through a line connection contact hole penetrating the first insulating layer, and
wherein the first sensing line extends to one side of a first direction, the second sensing line extends to an other side of the first direction, and the line connection contact hole includes a first line connection contact hole connecting the connection electrode and the first sensing line and a second line connection contact hole connecting the connection electrode and the second sensing line.

2. The display device of claim 1, further comprising:
a liquid crystal layer disposed between the lower panel and the upper panel.

3. The display device of claim 1,
wherein the sensing electrodes are arranged along the first direction and a second direction crossing the first direction.

4. The display device of claim 3,
wherein the sensing electrodes include a second sensing electrode disposed at one side of the first sensing electrode in the first direction and a third sensing electrode disposed at the other side of the first sensing electrode in the first direction, the first sensing electrode is electrically connected to the second sensing electrode through the first sensing line, and the first sensing electrode is electrically connected to the third sensing electrode through the second sensing line.

5. The display device of claim 4,
wherein the connection electrode is electrically connected to the first sensing electrode through an electrode connection contact hole extending through the first insulating layer.

6. The display device of claim 5,
wherein the first sensing electrode further includes a sensing protrusion electrode protruding between the first sensing line and the second sensing line in a plan view, and the connection electrode is electrically connected to the sensing protrusion electrode through the electrode connection contact hole.

7. The display device of claim 6,
wherein the sensing electrodes further include a fourth sensing electrode disposed at one side of the first sensing electrode in the second direction, the first sensing electrode further includes a sensing connection electrode extending from the sensing protrusion along the second direction, and the sensing connection electrode of the first sensing electrode is connected to the fourth sensing electrode.

8. The display device of claim 6,
wherein each of the first sensing line and the second sensing line includes an expansion sensing portion overlapping the connection electrode and an extension sensing portion not overlapping the connection electrode, and a width of the expansion sensing portion is greater than a width of the extension sensing portion.

9. The display device of claim 8,
wherein the blocking layer is disposed to overlap sensing electrode rows arranged in the first direction, and is disposed not to overlap a space between the sensing electrode rows spaced apart from each other along the second direction.

10. The display device of claim 8,
wherein the blocking layer is disposed to overlap the extension sensing portion, and is disposed not to overlap the expansion sensing portion.

11. The display device of claim 10,
wherein the upper panel further includes a second insulating layer disposed on the second touch conductive layer and a black matrix disposed on the second insulating layer, and the black matrix is disposed to overlap sensing electrode rows arranged in the first direction and is disposed not to overlap a space between the sensing electrode rows spaced apart from each other.

12. The display device of claim 11,
wherein the upper panel further includes a common electrode disposed on the black matrix, and the common electrode has a planar shape.

13. The display device of claim 11,
wherein the lower panel further includes a pixel electrode disposed in a space between the sensing electrode rows in a plan view and connected to a first transistor of the at least one transistor.

14. The display device of claim 1,
wherein each of the first touch conductive layer and the second touch conductive layer includes an opaque conductive material.

15. The display device of claim 1,
wherein a synchronous signal is applied to the sensing electrode and the blocking layer.

* * * * *